United States Patent
Yaginuma et al.

(10) Patent No.: US 6,585,429 B2
(45) Date of Patent: Jul. 1, 2003

(54) CAMERA SHUTTER UNIT HAVING A SHUTTER BLADE TO OPEN AND CLOSE AN EXPOSURE APERTURE

(75) Inventors: Daisuke Yaginuma, Tokyo (JP); Nabuaki Watanabe, Tokyo (JP); Tomokazu Kihara, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/858,213

(22) Filed: May 15, 2001

(65) Prior Publication Data

US 2001/0041074 A1 Nov. 15, 2001

(30) Foreign Application Priority Data

May 15, 2000 (JP) ........................................ 2000-147469

(51) Int. Cl.[7] ............................. G03B 9/00; G03B 9/08
(52) U.S. Cl. ...................... 396/458; 396/449; 396/460
(58) Field of Search ................................ 396/458, 460, 396/463, 501, 449

(56) References Cited

FOREIGN PATENT DOCUMENTS

| JP | 2001-066659 A | * | 3/2001 | ............ G03B/9/02 |
| JP | 2001-066660 A | * | 3/2001 | ............ G03B/9/02 |

* cited by examiner

Primary Examiner—Russell Adams
Assistant Examiner—Arthur A Smith
(74) Attorney, Agent, or Firm—Pillsbury Winthrop LLP

(57) ABSTRACT

The camera shutter unit of the present invention is provided with a diaphragm blade arranged to be capable of moving between a stopping-down position wherein an aperture is stopped down, and an evacuating position wherein the aperture is opened. A shutter blade is arranged to be capable of moving between an opening position, wherein the aperture is opened, and a closing position, wherein the aperture is closed. A drive-control mechanism is provided for drive-controlling the shutter blade and the diaphragm blade. The drive-control mechanism has a single electromagnetic drive source, and a spring for restricting movement of the shutter blade toward the closing position when the diaphragm blade is positioned in the stopping-down position, and for releasing its restriction by a predetermined or more drive force generated by the electromagnetic drive source. Therefore, the unit can be of a small size and low in cost, and its reliability of function can be improved.

5 Claims, 12 Drawing Sheets

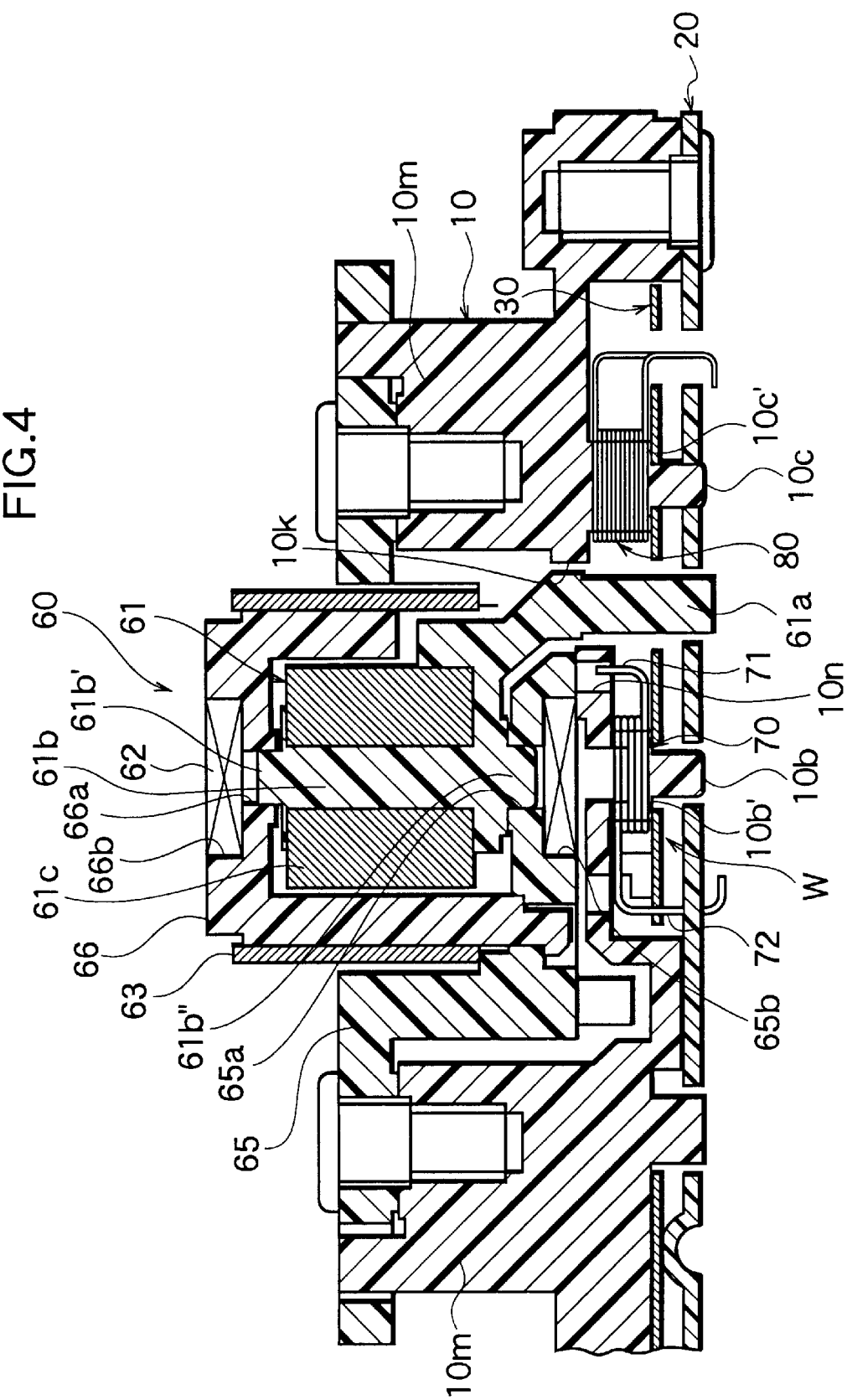

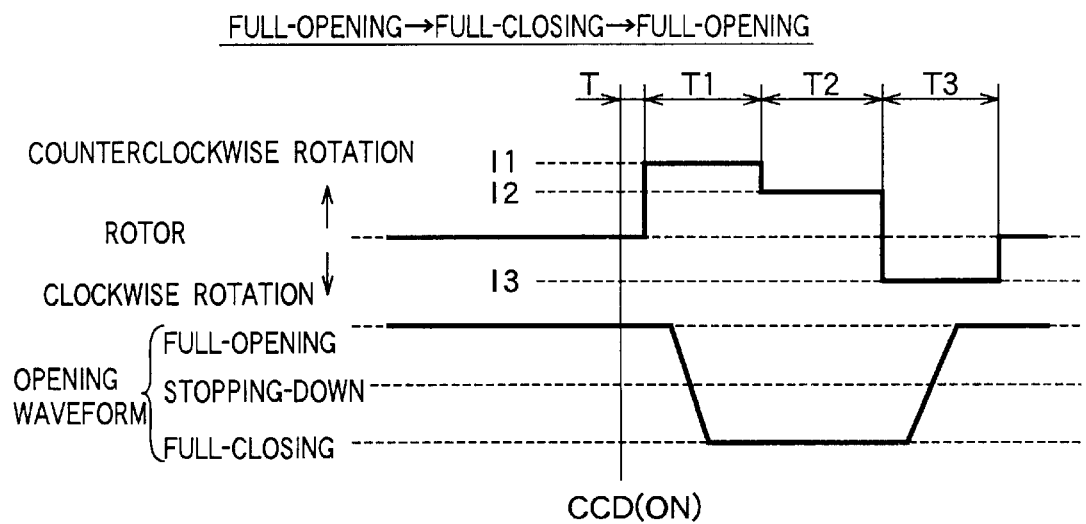
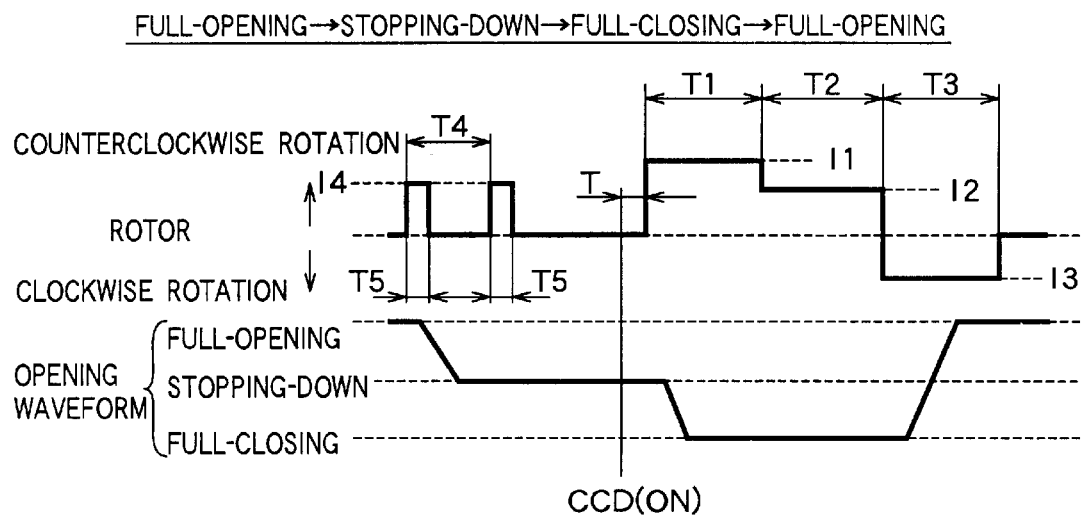

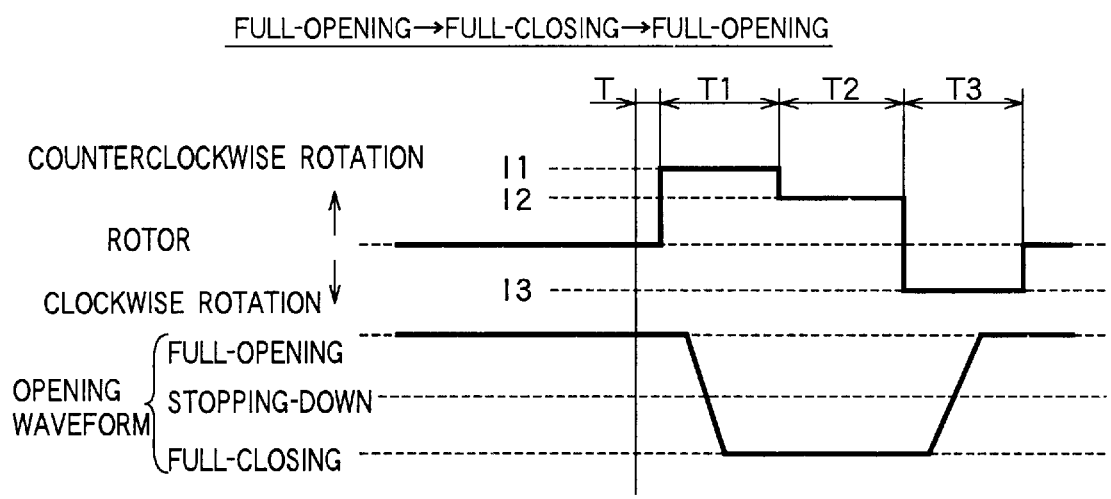
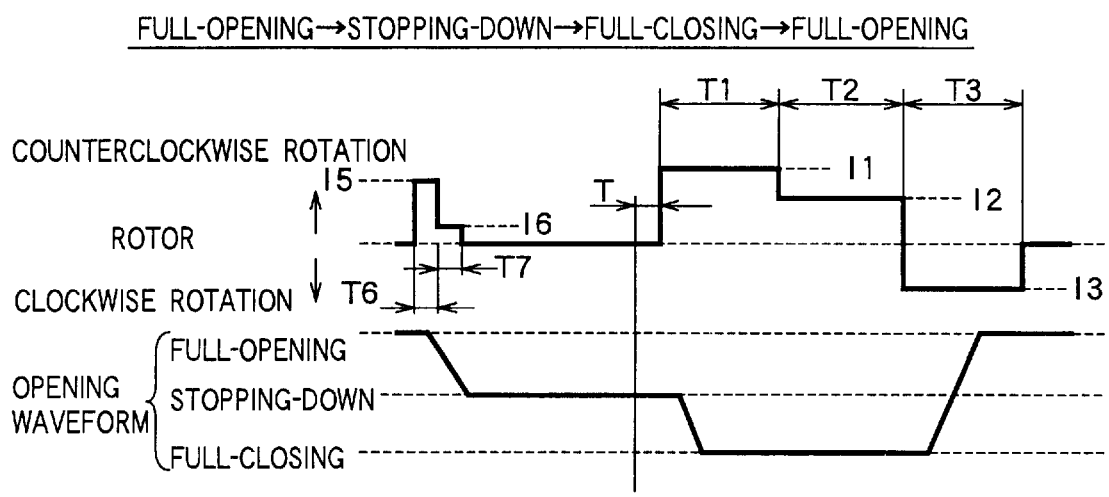

CAMERA SHUTTER UNIT HAVING A SHUTTER BLADE TO OPEN AND CLOSE AN EXPOSURE APERTURE

BACKGROUND OF THE INVENTION

1. Field of the Invention

The present invention relates to a camera shutter unit adapted to a digital still camera or the like and, more particularly to a camera shutter unit which is separately provided with a shutter blade for opening and closing an exposure aperture and a diaphragm blade for stopping down the aperture.

2. Description of the Related Art

Unexamined Japanese Patent Publication (koka) No.10-221740, for example, discloses a conventional camera shutter unit in which separately installed are a shutter blade opening and closing an exposure aperture wherethrough light passes and a diaphragm blade stopping down the aperture.

This camera shutter unit includes a shutter blade arranged at a periphery of the aperture so as to move back and forth to open and close the aperture, one electromagnetic drive source for driving the shutter blade, a diaphragm blade arranged so as to move back and forth to stop down the aperture and release the stopping-down, and another electromagnetic drive source for driving the diaphragm blade.

Thereupon, when respective electromagnetic drive sources start, the shutter blade moves back and forth between an opening position wherein the aperture is opened and a closing position wherein the aperture is closed to open and close the aperture and the diaphragm blade moves back and forth between a stopping-down position wherein the aperture is stopped down and an evacuating position wherein the aperture is not stopped down. Also, when respective electromagnetic drive sources are not energized, the shutter blade is held in either an opening or a closing position and the diaphragm blade is held in either stopping-down or evacuating position.

By the way, with respect to the above conventional camera shutter unit, separate drive sources are provided for driving the shutter blade and diaphragm blade. Therefore, the shutter blade and diaphragm blade can be driven separately without using a complicated linkage. However, since separate electromagnetic drive sources are provided, the unit is large-sized, heavyweight, high-cost or the like and consumes a large amount of power in accordance with the number of electromagnetic drive sources.

Also, upon drive of the diaphragm blade and so on, in case only the electromagnetic drive source starts to move to the diaphragm blade, when positioned in a predetermined stopping down position, the diaphragm blade might bounce and therefore, when stopping down rapidly, the response characteristic of diaphragm blade is not preferable.

In view of the foregoing, an object of the present invention is to provide a camera shutter unit which adopts a mechanism for interlocking a diaphragm blade with a shutter blade without complexity of the unit, whereby the shutter blade and diaphragm blade can function reliably being a small size, be lightweight, low-cost, or the like.

SUMMARY OF THE INVENTION

To achieve the above-mentioned object, a camera shutter unit according to the present invention comprises a base plate having an exposure aperture, a diaphragm blade arranged to be capable of moving between a stopping-down position wherein the aperture is stopped down and an evacuating position wherein the aperture is opened (is not stopped down), a shutter blade arranged to be capable of moving between an opening position wherein the aperture is opened and a closing position wherein the aperture is closed, and a drive-control mechanism for dive-controlling the shutter and diaphragm blades. The drive-control mechanism is composed of a single electromagnetic drive source which can drive the shutter and diaphragm blades so as to interlock the diaphragm blade with the shutter blade, and a restricting means for restricting movement of the shutter blade toward the closing position when the diaphragm blade is positioned in the stopping-down position and for releasing its restriction by a predetermined or more level drive force which is generated by the electromagnetic drive source.

Accordingly, when the single electromagnetic drive source starts, the shutter blade moves from the opening position to the closing position or from the closing position to the opening position and the diaphragm blade moves from the evacuating position to the stopping-down position or from the stopping-down position to the evacuating position.

Hereupon, for example, in the case of one operating mode in which the shutter operation is carried out without the diaphragm blade stopping down, when the electromagnetic drive source starts so as to generate a predetermined or more level drive force with the shutter blade being in the opening position and the diaphragm blade being in the evacuating position, the shutter blade moves to the closing position and the diaphragm blade moves to the stopping-down position. At this time, since the shutter blade immediately moves to the closing position without staying in a way position, the stopping-down of the aperture is not carried out by only the diaphragm blade.

On the other hand, in the case of another operating mode in which the shutter operation is carried out after stopping down by the diaphragm blade, when the electromagnetic drive source starts, in the course that the diaphragm blade moves to the stopping-down position, the restricting means acts on the shutter blade to restrict the movement thereof toward the closing position. In this condition, when the electromagnetic drive source generates a predetermined or more level drive force, its restriction is released, whereby only the shutter blade moves to the closing position. In both operating modes above-mentioned, when the electromagnetic drive source starts in reverse, the shutter blade moves to the opening position and the diaphragm blade moves to the evacuating position.

Thus, the single electromagnetic drive source can drive the shutter and diaphragm blades and there is provided with the restricting means which can restrict movement of the shutter blade and can release its restriction, in accordance with the amount of drive force generated by the electromagnetic drive source. Therefore, the shutter and diaphragm blades can function reliably and the unit can become small size, lightweight, or the like.

In the above unit, the restricting means may be of a spring which urges the shutter blade toward the opening position when the shutter blade is positioned between the closing position and the way position wherein the diaphragm blade is in the stopping-down position.

Accordingly, when the single electromagnetic drive source starts to make the shutter blade move from the opening position to the closing position, the urging force of the spring restricts more movement of the shutter blade, whereby the diaphragm blade interlocked with the shutter blade is held in the stopping-down position. Further, when the electromagnetic drive source is energized to generate a predetermined or more level drive force, its restriction is released against the urging force of the spring, so that only the shutter blade moves to the dosing position. Thus, adoption of the single spring serving as a restricting means makes it possible to improve the reliability of function and to simplify the unit.

In the above unit, the electromagnetic drive source may be magnetic-urged so as to keep the shutter blade in the way position and keep the diaphragm blade in the stopping-down position, in a non-energized condition.

Accordingly, when the electromagnetic drive source is energized to generate drive force whereby the shutter blade reaches the way position and the diaphragm blade reaches the stopping-down position, the energizing of the electromagnetic drive source is stopped. As a result, the shutter blade is held in the way position and the diaphragm blade is held in the stopping-down position, by the force relationship between the magnetic force from the electromagnetic drive source and the force from the restricting means (the spring force), namely, by the force relationship in which this magnetic force does not release the restriction, whereby its restricting condition is kept. That is, since the stopping-down condition is kept with the electromagnetic drive source being non-energized, power consumption of the unit can be reduced.

In the above unit, the electromagnetic drive source may be magnetic-urged so as to keep the shutter blade in the opening position and keep the diaphragm blade in the evacuating position, in a non-energized condition.

Accordingly, when the electromagnetic drive source is energized to generate drive force whereby the shutter blade reaches the opening position and the diaphragm blade reaches the evacuating position, the energizing of the electromagnetic drive source is stopped. As a result, the magnetic force of the electromagnetic drive source keeps the shutter blade in the opening position and keeps the diaphragm blade in the evacuating position. That is, since the opening condition and releasing condition of the stopping-down are held in a non-energized condition, power consumption of the unit an be reduced.

In the above unit, the drive-control mechanism may comprise a control means for controlling the electromagnetic drive source, wherein this control means controls the electromagnetic drive source by generating plural pulses when making the diaphragm blade move to the stopping-down position.

Accordingly, when the drive force of the electromagnetic drive source makes the diaphragm blade move to the stopping-down position, the plural (for example, two times) pulse energizing-control restrains bouncing of the diaphragm blade. In other words, the behavior of diaphragm blade is converged in a short time, whereby the diaphragm blade is rapidly positioned in the stopping-down position Also, in the above unit, the drive-control mechanism may comprise a control means for controlling the electromagnetic drive source, wherein this control means controls the electromagnetic drive source so as to decrease the amount of current (or voltage) during a predetermined energized time, when making the diaphragm blade move to the stopping-down position.

Accordingly, when the drive force of the electromagnetic drive source makes the diaphragm blade move to the stopping-down position, the energizing-control, which for example decreases current (or voltage) in the form of steps or continuously, prevents the diaphragm blade from bouncing or restrains it. In other words, the behavior of diaphragm blade is converge in a short time, whereby the diaphragm blade is rapidly positioned in the stopping-down position.

BRIEF DESCRIPTION OF THE DRAWINGS

The above and other objects and features of the present invention will become understood from the following description taken in connection with the accompanying drawings in which:

FIG. 4 is a spread sectional view showing an electromagnetic drive source forming a part of the camera shutter unit;

FIGS. 10A and 10B show one embodiment of a control sequence for controlling motion of the camera shutter unit and FIG 10A is a time chart as to one operating mode without stopping down and FIG. 10B is a time chart as to another operating mode with stopping down;

FIGS. 11A and 11B show another embodiment of a control sequence for controlling motion of the camera shutter unit and FIG 11A is a time chart as to one operating mode without stopping down and FIG. 11B is a time chart as to another operating mode with stopping down.

DESCRIPTION OF THE PREFERRED EMBODIMENTS

Hereinbelow, preferred embodiments of a camera shutter unit according to the present invention will be described with reference to the accompanying drawings.

Figure 1:
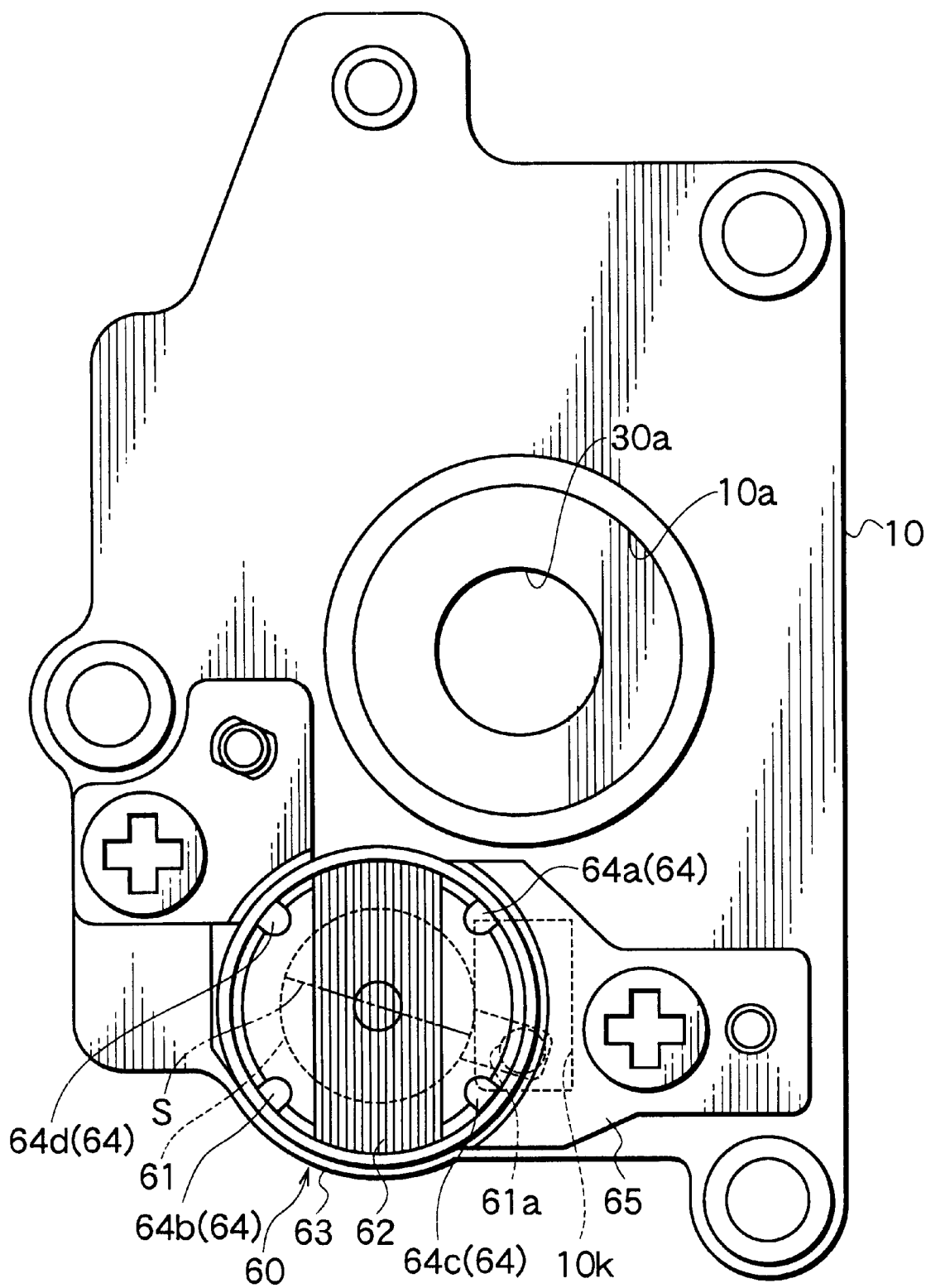
FIG. 1 is a plan view showing an embodiment of a camera shutter unit according to the present invention.
Figure 2:
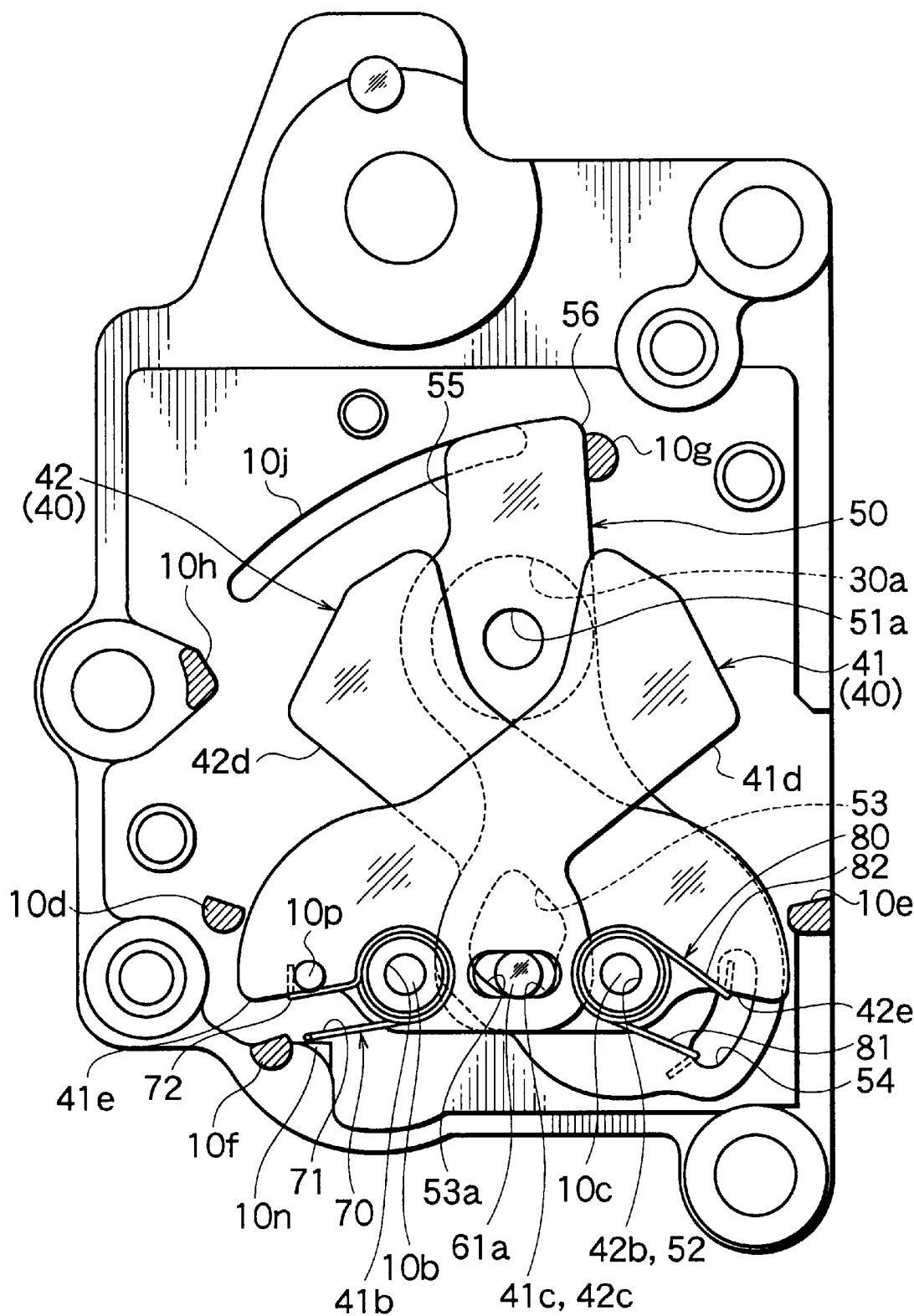
FIG. 2 is a plan view showing an internal construction of the camera shutter unit.

In this embodiment, the camera shutter unit, as shown in FIG. 1, FIG. 2 and FIG. 4, is provided with a base plate 10 and a covering plate 20 defining an outline of the unit, a middle plate 30 sandwiched between the base plate 10 and the covering plate 20 and forming an exposure aperture 30a through which light passes, a shutter blade 40 for opening and closing the aperture 30a, a diaphragm blade 50 having an opening for obtaining a predetermined aperture diameter, a drive-control mechanism, which includes an electromagnetic drive source 60, a restricting means 70, a control means (CPU and the like), for driving and controlling so as to make the shutter blade 40 and the diaphragm blade 50 move on a predetermined timing, and so on.

The base plate 10, as shown in FIG. 1, is formed with a rectangular-shaped outline and made of resin material and the like. An outside center portion of the base plate 10 is provided with an aperture 10a which is formed so as to expose the aperture 30a. As shown in FIG. 4, a back side of the base plate 10 is provided with supporting shafts 10b, 10c which rotatable-support the shutter blade 40 and diaphragm blade 50 respectively, as shown in FIG. 2, open side stoppers 10d, 10e and a close side stopper 10f which restrict movement of the shutter blade 40, a diaphragm side stopper 10 g and a release side stopper 10h which restrict movement of the diaphragm blade 50, a supporting rib 10j which supports the diaphragm blade 50, or the like. Also, as shown in FIG. 1, the base plate 10 is provided with an opening 10k which allows the movement of a driving pin 61a forming part of the electromagnetic drive source 60.

The covering plate 20 has a rectangular-shaped outline as same to that of the base plate 10, as shown in FIG. 4, and is connected to the base plate 10 with concave-convex fitting, screw or the like. Also, the middle plate 30 is sandwiched between the base plate 10 and the covering plate 20. Further, arranged in the space between the middle plate 30 and the base plate 10 is a spring 70 or the like serving as the restricting means. Also, defined between the middle plate 30 and the covering plate 20 is a blade room W in which the shutter blade 40 and diaphragm blade 50 are arranged. Besides, the middle plate 30 mainly defines the blade room W and further restricts an aperture diameter by the aperture 30a having a relative small aperture diameter.

Figure 3A:
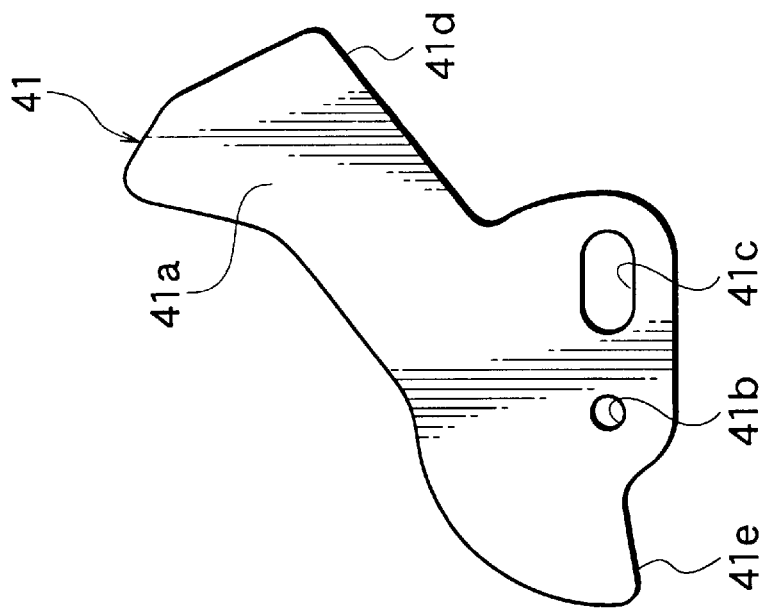
FIGS. 3A and 3B are plan views showing first and second shutter blades forming part of the camera shutter unit and FIG. 3C is a plan view showing a diaphragm blade forming a part of the camera shutter unit.
Figure 3B:
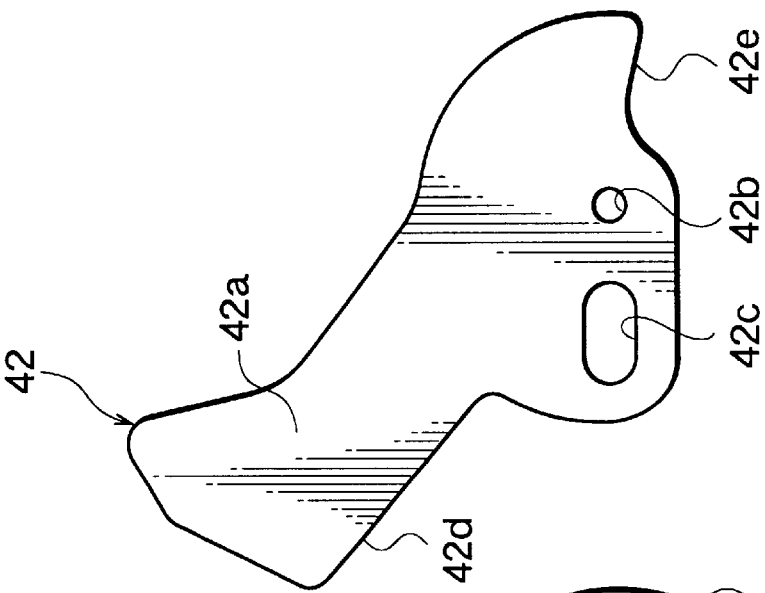

The shutter blade 40, as shown in FIGS. 2, 3A, and 3B, is composed of two blades of a first shutter blade 41 and a second shutter blade 42, respective which are formed with shield portions 41a, 42a, holes 41b, 42b rotatable-supported by supporting shafts 10b, 10b, and elongated holes 41c, 42c to which the driving pin 61a of the electromagnetic drive source 60 is connected.

Further, the driving pin 61a is inserted into elongated holes 41c, 42c with movable fitting. When the driving pin 61a moves toward the under side on FIG. 2, the first shutter blade 41 and the second shutter blade 42 respectively rotate to be positioned in the opening position wherein the aperture 30a is opened. On the other hand, when the driving pin 61a moves toward the upper side on FIG. 2, the first shutter blade 41 and the second shutter blade 42 respectively rotate to be positioned in the closing position wherein the aperture 30a is closed.

Figure 7:
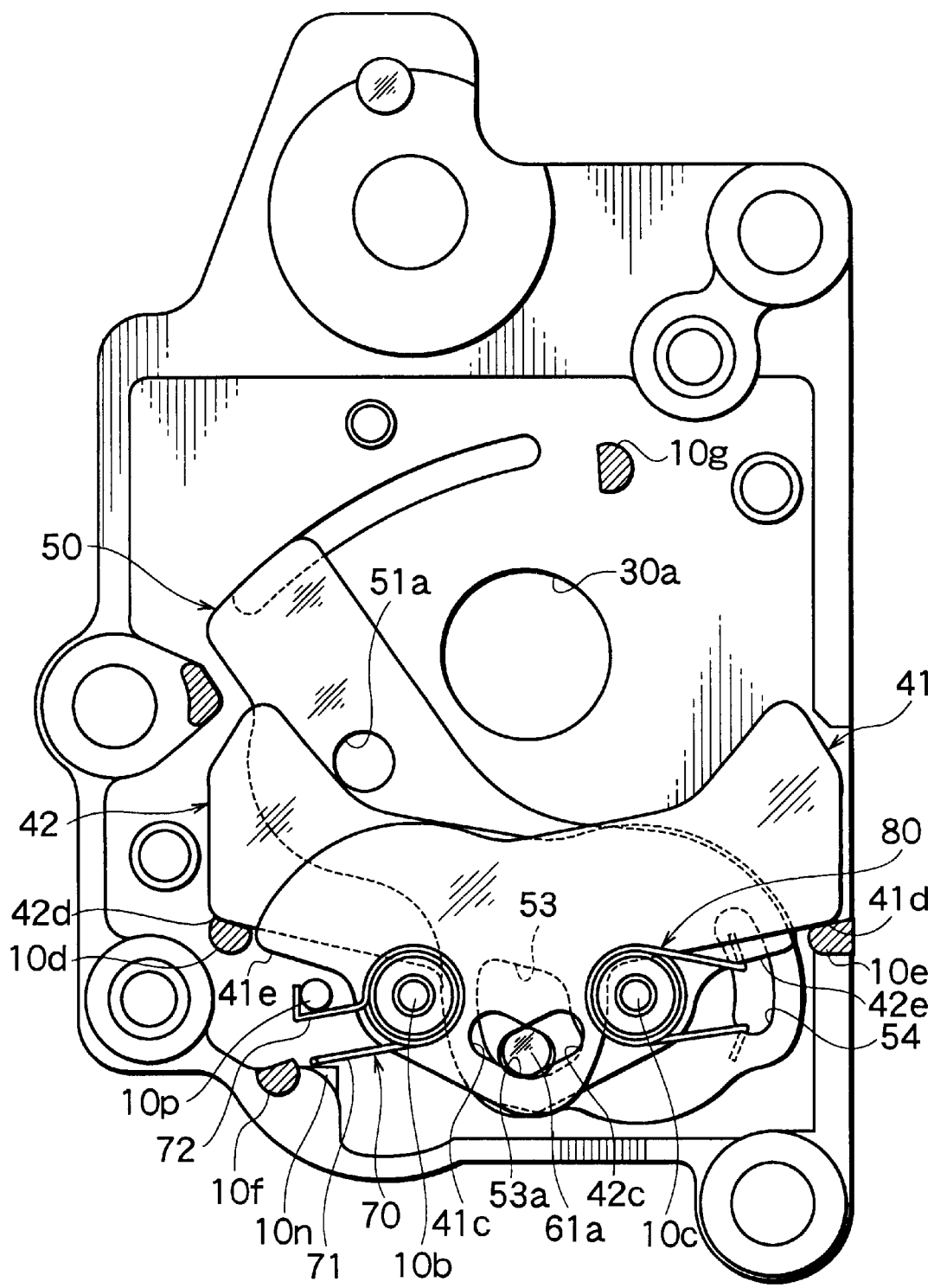
FIG. 7 is a plan view showing a condition in which the shutter blade is in an opening position wherein an aperture is opened and the diaphragm blade is in the evacuating position wherein the aperture is not stopped down.
Figure 9:
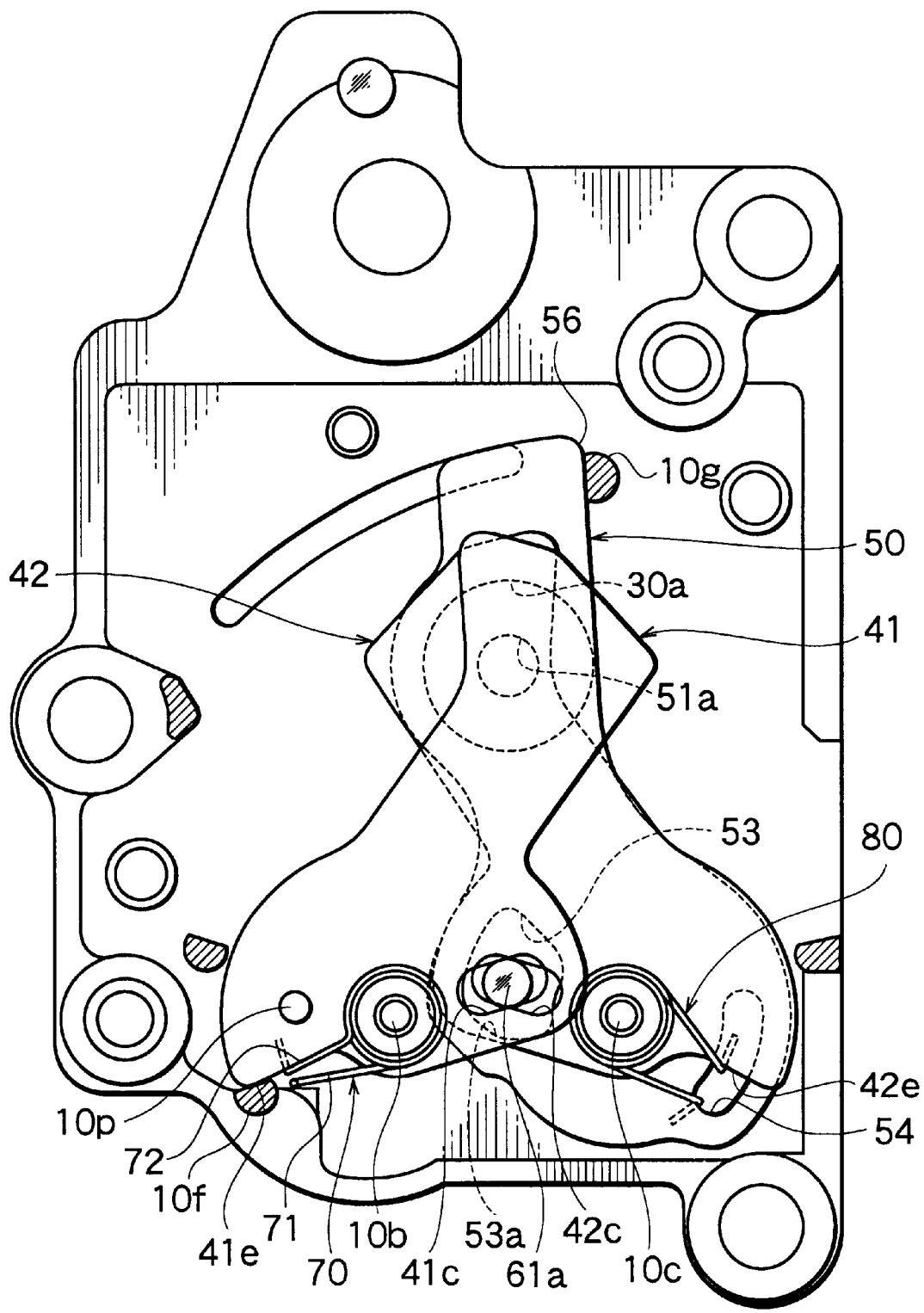
FIG. 9 is a plan view showing a condition in which the shutter blade is in the closing position wherein the aperture is dosed and the diaphragm blade is in the stopping-down position wherein the aperture is stopped down.

Here, in the opening position, as shown in FIG. 7, an edge 41d of the first shutter blade 41 is in contact with the stopper 10e and an edge 42d of the second shutter blade 42 is in contact with the stopper 10d, whereby further movements toward opening side of first and second shutter blades 41, 42 are restricted. Also, in the closing position, as shown in FIG. 9, an edge 41e of the first shutter blade 41 is in contact with the stopper 10f, whereby further movements toward the closing side of the first and second shutter blades 41, 42 are restricted. Besides, the first shutter blade 41 and the second shutter blade 42 are interlocked with each other. Therefore, even if only one of the stoppers 10d, 10e is adopted, each movement of both blades can be restricted.

Figure 3C:
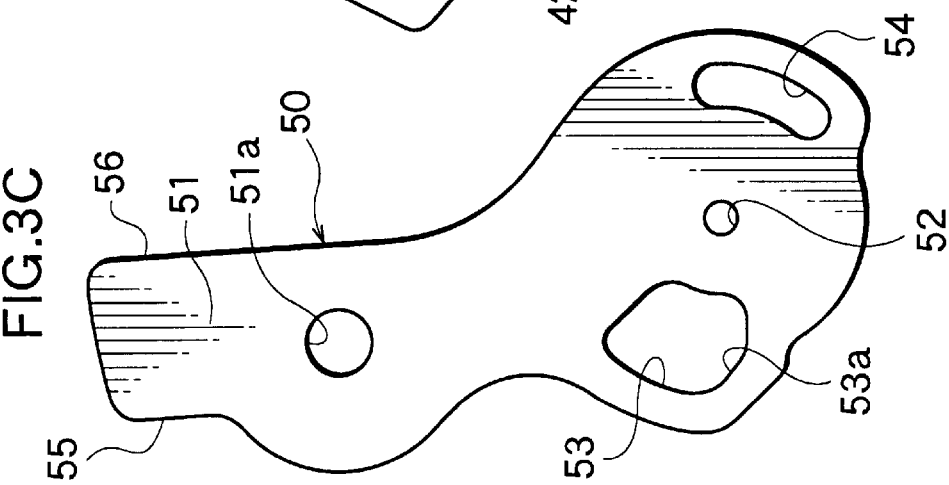

The diaphragm blade 50, as shown in FIGS. 2 and 3C, is composed of a diaphragm portion 51 having an opening 51a which is specified by a predetermined aperture diameter, a hole 52 supported by the supporting shaft 10c, a contact hole 53 capable of coming in contact with the driving pin 61a, and an elongated hooking hole 54 on which a spring 80 described hereinafter is hooked. Further, as shown in FIG. 2, the diaphragm blade 50 is rotatable-supported by the supporting shaft 10c at its hole 52. Also, as shown in FIG. 4, the spring 80 outer-fitted to the supporting shaft 10c is arranged between the diaphragm blade 50 and the second shutter blade 42.

That is, as shown in FIG. 2, one end 81 of the spring 80 is hooked on the hooking hole 54 of the diaphragm blade 50, another end 82 is hooked on an edge 42e of the second shutter blade 42 and the second shutter blade 42 and the diaphragm blade 50 are continually urged in opposite directions each other about the supporting shaft 10c, so that the diaphragm blade 50 is capable of following movement of the second shutter blade 42.

Further, as shown in FIG. 2, the driving pin 61a is movably inserted (or movably fitted) into the contact hole 53 of the diaphragm blade 50. When the diaphragm blade 50 is not over the aperture 30a, the urging force of the spring 80 makes an under inside edge 53a of the contact hole 53 be in contact with the driving pin 61a. When the driving pin 61a moves toward the under side on FIG. 2, the first shutter blade 41 and the second shutter blade 42 move toward opening direction (toward the opening position) and then, as shown in FIG. 7, the diaphragm blade 50 rotates in the counter-clockwise direction to reach the evacuating position wherein driving pin 61a moves toward the under side on FIG. 2, the first shutter blade 41 and the second shutter blade 42 move toward the opening direction (toward the opening position) and then, as shown in FIG. 7, the diaphragm blade 50 rotates in the counterclockwise direction to reach the evacuating position wherein the aperture 30a is opened. While, when the driving pin 61a moves toward the upper side on FIG. 2, the movement toward the closing direction (toward the closing position) of the first and second shutter blades 41, 42 and the urging force of the spring 80 make the diaphragm R blade 50 rotate in the clockwise direction to reach the stopping-down position wherein the diaphragm blade 50 is over the aperture 30a, as shown in FIGS. 2, 8 and 9.

Here, in the evacuating position, the diaphragm blade 50 remains in a predetermined evacuating position in accordance with balance between the driving force of the driving pin 61a and the urging force of the spring 80. In case the driving force of the driving pin 61a becomes greater, a left side edge 55 of the diaphragm blade 50 comes in contact with the stopper 10h, whereby its excess movement is temporarily restricted.

Figure 8:
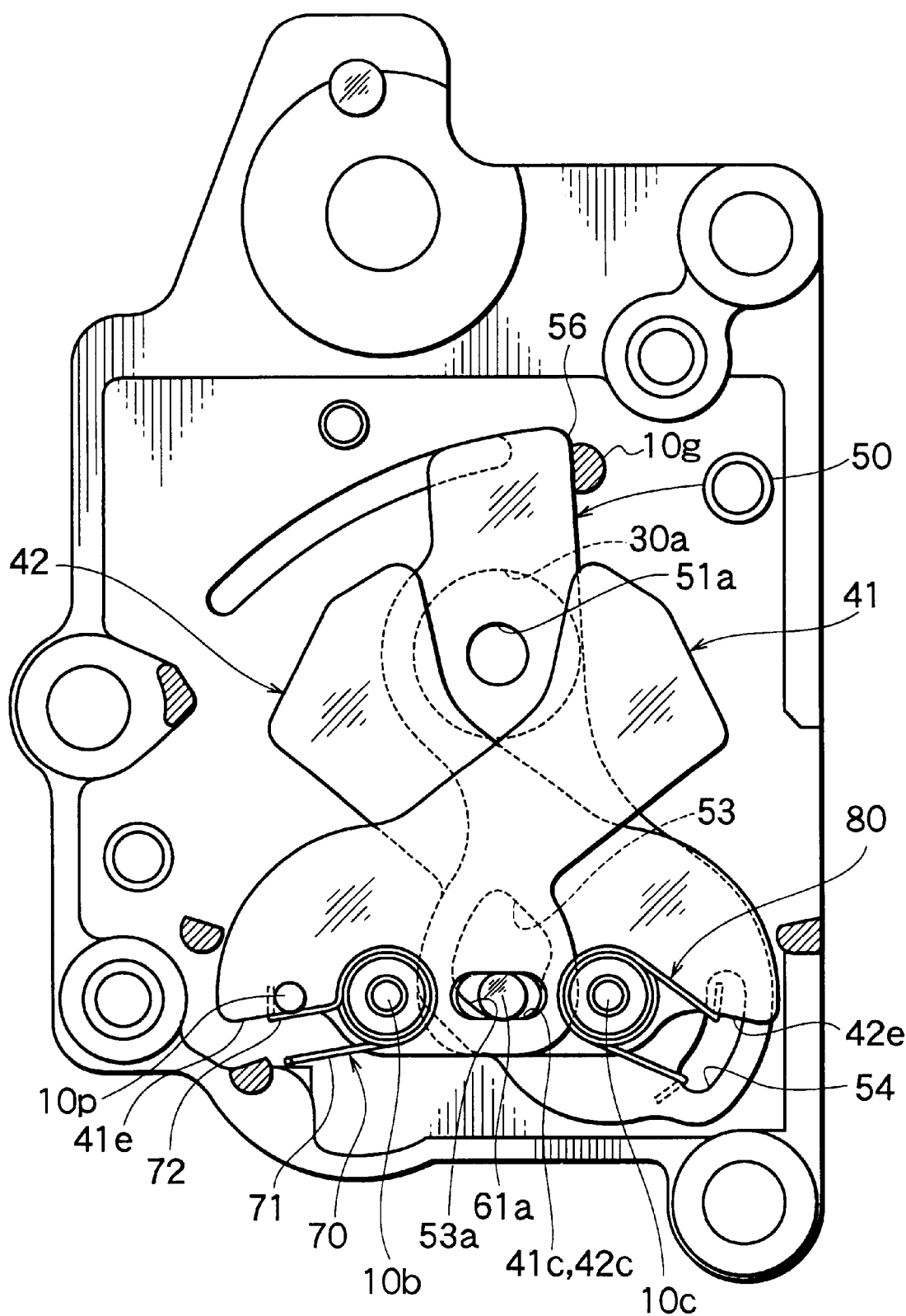
FIG. 8 is a plan view showing a condition in which the shutter blade is in the way position and the diaphragm blade is in the stopping-down position wherein the aperture is stopped down.

On the other hand, in the stopping-down position, as shown in FIGS. 2, 8 and 9, a right side edge 56 of the diaphragm blade 50 comes in contact with the stopper 10g, whereby its excess clockwise rotation is restricted. The electromagnetic drive source 60 forming part of the drive-control mechanism, as shown in FIGS. 1 and 4, is a moving magnet-typed actuator such as an iris motor which is composed of rotor 61 rotatable-arranged within the range of a predetermined angle, a coil 62 for energizing, a cylindrical yoke 63 arranged to form a magnetic circuit, four magnetic pins 64 (64a, 64b, 64c and 64d) made of magnetic material, and inside and outside supporting frames 65, 66 for holding these parts. The rotor 61 is in the shape of a column, and as shown in FIG. 4, is composed of a rotation shaft 61b integrally formed with the driving pin 61a, a permanent magnet 61c and so on. Here, the rotation shaft 61b and the driving pin 61a are molded with resin material and the permanent magnet 61c is magnetized to N and S poles. Further, both ends 61b' and 61b" of the rotation shaft 61b are respectively rotatable-supported by a bearing hole 66a in the outside supporting frame 66 and a bearing hole 65a in the inside supporting frame 65.

The outside supporting frame 66 and the inside supporting frame 65, as shown in FIG. 4, are provided with rectangular cross section-shaped grooves 66b, 65b in which the coil 62 is wound. Also, the peripheral surface of the outside supporting frame 66 is outer-fitted with the cylindrical yoke 63 and further the inside of the yoke 63 is arranged with four magnetic pins 64 (64a, 64b, 64c and 64d) at equal intervals (i.e. spaced about 90 degrees apart). Besides, the inside supporting frame 65 is fixed to a mounting flange 10m formed on the base plate 10 by screw and the like. The outside supporting frame 66 is fixed to the inside-supporting frame 65 by a connecting claw and the like.

Figure 5A:
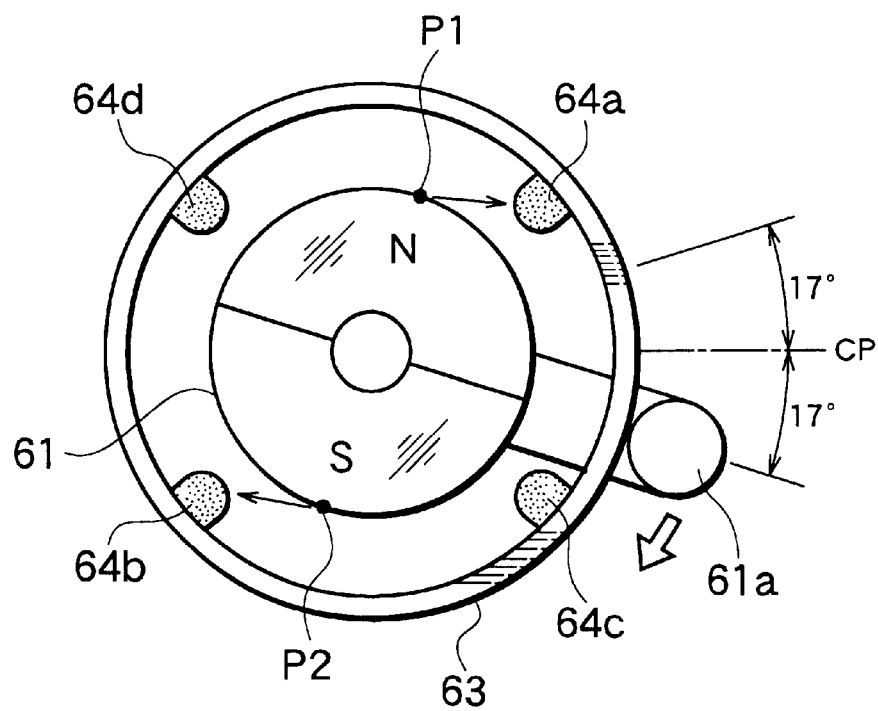
FIG. 5A is a plan view showing a condition in which a magnetic force acts to urge shutter and diaphragm blades toward respective opening and evacuating positions and FIG. 5B is a plan view showing a condition in which a magnetic force acts to urge shutter and diaphragm blades toward respective way and stopping-down positions.

With respect to the relationship between the rotation range of the rotor 61 and the magnetic force of the permanent magnet 61c, as shown in FIG. 5A, when the shutter blade 40 is in the opening position and the diaphragm blade 50 is in the evacuating position, wherein the diaphragm blade 50 evacuates from the aperture 30a, with the coil 62 being non-energized, the rotor 61 is magnetic-urged in the clockwise direction. Also, as shown in FIG. 5B, when the diaphragm blade 50 is in the stopping-down position, wherein the diaphragm blade 50 is over the aperture 30a and the shutter blade 40 is in the way position where it is between the opening position and the closing position, with he coil 62 being non-energized, the rotor 61 is magnetic-urged in the counterclockwise direction.

That is, the rotor 61 is rotatable within the range of a predetermined angle (here, about 34°), when being in the clockwise rotation end position corresponding to the opening position and the evacuating position as to the shutter blade 40 and the diaphragm blade 50, as shown in FIG. 5A, the N polar side of the permanent magnet 61c is in a position such as to be attracted by the magnetic pin 64a and the S polar side of the permanent magnet 61c is in a position such as to be attracted by the magnetic pin 64b. Consequently, with the coil 62 being non-energized, the rotor 61 is urged in the clockwise direction by the magnetic attraction force generated between the permanent magnet 61c and the magnetic pins. Accordingly, even in non-energized condition, the shutter blade 40 and the diaphragm blade 50 can be respectively held in the opening position and the evacuating position, so that power consumption of the unit can be reduced.

Figure 5B:
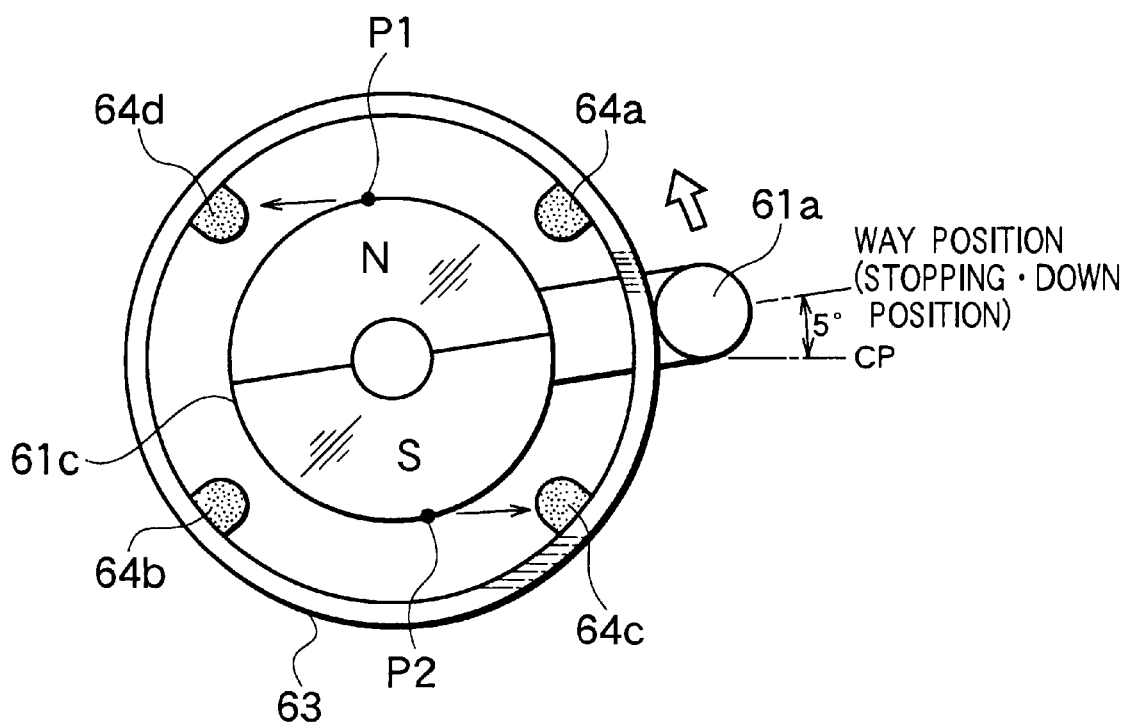

Also, when the rotor 61 is in the angle position corresponding to the way position and the stopping-down position as to the shutter blade 40 and the diaphragm blade 50, namely, is in the angle position rotated a determined angle (here, about 5°) in the counterclockwise direction from the center (C P) of operating angle, as shown in FIG. 5B, the N polar side of the permanent magnet 61c is in a position such as to be attracted by the magnetic pin 64d and the S polar side of the permanent magnet 61c is in a position such as to be attracted by the magnetic pin 64c. In this condition, between the center point P1 and the magnetic pin 64d is generated a magnetic attraction force and between the center point P2 and the magnetic pin 64c is generated a magnetic attraction force. Consequently, with the coil 62 being non-energized, the rotor 61 is urged in the counterclockwise direction by the magnetic attraction force generated by the permanent magnet 61c. Accordingly, even in non-energized condition, the shutter blade 40 and the diaphragm blade 50 can be respectively held in the way position and the stopping-down position, so that power consumption of the unit can be reduced.

The spring 70 serving as the restricting means forming part of the drive-control mechanism, as shown in FIGS. 2 and 4, is a torsion-typed spring which is held by the base plate 10 and intervened such that the first shutter blade is urged in the clockwise direction. The spring 70, as shown in FIG. 4, is outer-fitted to the supporting shaft 10b. As shown in FIG. 2, one end 71 thereof is hooked on to a hooking portion 10n on the base plate 10 (the position of the hook portion 10n shown in FIG. 4 does not correspond to the position shown in FIG. 2 since FIG. 4 is a spread view). Also, another end 72 thereof is hooked onto a hook projection 1op, and further the edge 41e of the first shutter blade 41 is capable of coming in contact with and departing from the another end 72.

That is, as shown in FIG. 7, with the first and second shutter blades 41, 42 being in the opening position and the diaphragm blade 50 being in the evacuating position, the one end 71 of the spring 70 is in contact with the hook portion 10n and the another end 72 is in contact with the hook projection 10p, thereby being restricted not to be extend out more. Further, the edge 41 of the first shutter blade 41 is away from the another end 72.

On the other hand, as shown in FIGS. 2 and 8, with the driving pin 61a rotating in the counterclockwise direction and the diaphragm blade 50 being in the stopping-down position and further the first and second shutter blades 41, 42 being in the way position, the another end 72 of the spring 70 is in contact with the hook projection 10p, thereby being restricted not to extended out more. Further, the edge 41e of the first shutter blade 41 is in contact with the another end 72. Therefore, although the rotor 61 tends to rotate further in the counterclockwise direction by the magnetic attraction force, the urging force of the spring 70 restricts the excess counterclockwise rotation of the first shutter blade 41.

Further, as shown in FIG. 9, with the driving pin 61a rotating further in the counterclockwise and the diaphragm blade 50 being in the stopping-down position and further the first and second shutter blades 41, 42 being in the closing position, the another end 72 of the spring 70 is pushed by the edge 41e of the first shutter blade 41 to depart from the hook projection 10p, whereby the spring 70 is deformed maximally.

The urging force of the spring 70 acts on the first and second shutter blades 41, 42 except for condition wherein the another end 72 is in contact with the hook projection 10p.

Thus, the adoption of the torsion-typed spring 70 serving as the restricting means makes it possible to simplify the construction of the whole unit. Consequently, it is possible for the shutter blade 40 and the diaphragm blade 50 to function reliably and therefore, it is possible to downsize and lighten the whole unit.

Figure 6:
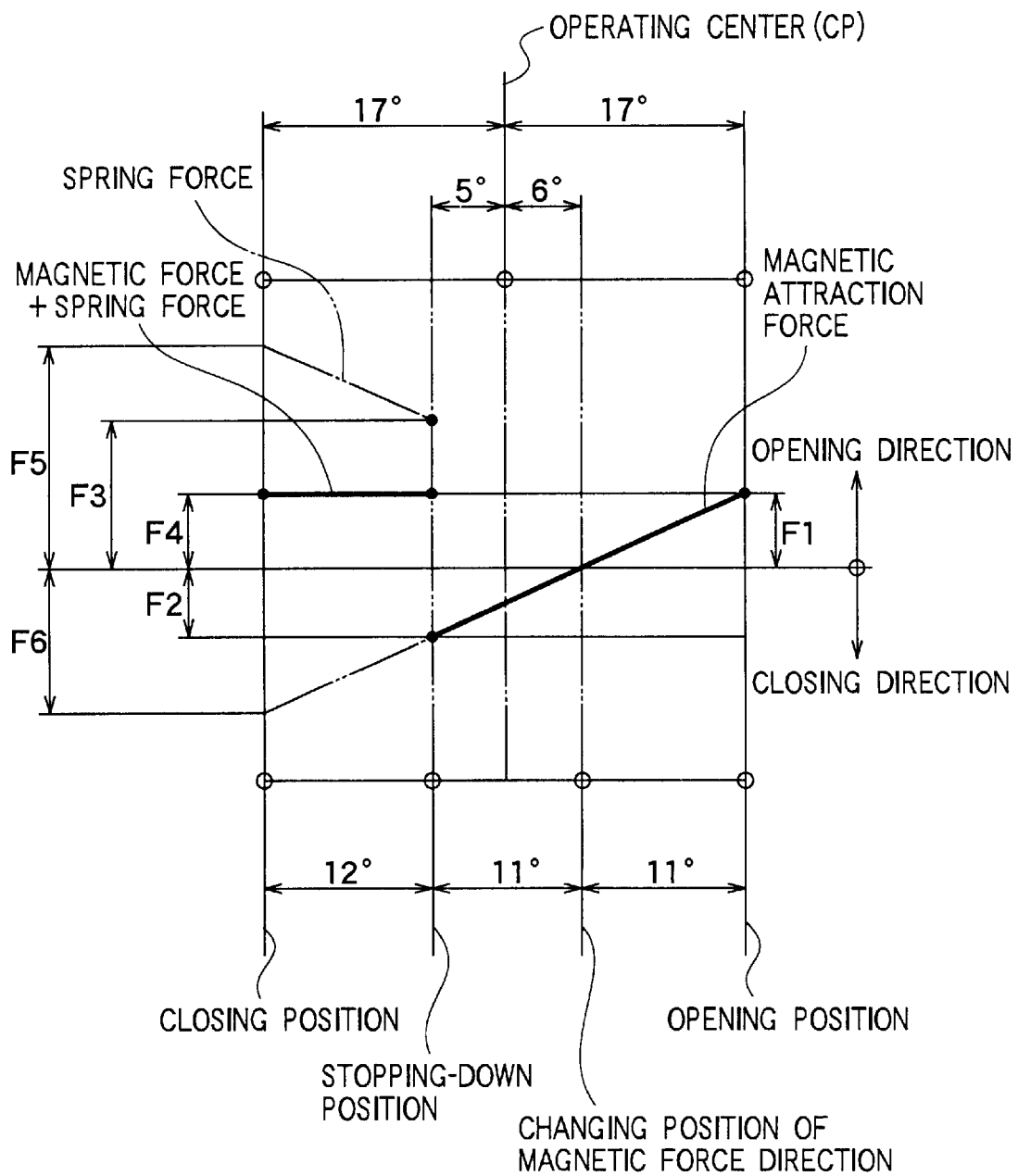
FIG. 6 is a view showing a relationship between a spring force serving as a restricting means and an acting force from the electromagnetic drive source.

The relationship between the urging force of the above-mentioned spring 70 and the magnetic attraction force of the electromagnetic drive source 60 with non-energized becomes a characteristic shown in FIG. 6. That is, when the operating angle of the rotor 61 is about 34° (17°+17°) and the rotor 61 is positioned in the clockwise rotation end in the rotatable range, namely when the shutter blade 40 is in the opening position and the diaphragm blade 50 is in the evacuating position, the rotor 61 generates a magnetic attraction force F1 which acts on the shutter blade 40 to move it toward the opening direction.

Also, the rotor 61 has a balanced position (changing position of magnetic force direction) wherein the rotor 61 is in the position clockwise-rotated by about 6 degrees from the center (operating center: CP) of the rotatable angle range and does not generate rotating force. The position counterclockwise-rotated by about 5 degrees from the operating center of the rotor 61 corresponds to the stopping-down position of the diaphragm blade 50 (and the way position of the shutter blade 40). In this position, the rotor 61 generates a magnetic attraction force F2 that urges the diaphragm blade 50 to the closing direction. Also, even with the another end 72 of spring 70 being slightly pushed, the spring 70 generates a force F3 such as to push back the shutter blade 40 to the opening direction.

That is, in this stopping-down condition, the force relationship between the magnetic attraction force F2 urging the rotor 61 to the closing direction and the urging force (spring force) F3 (>F2) of the spring 70, namely, the force relationship in which only the magnetic attraction force F2 retains the rotor 61 in its position keeps the shutter blade 40 in the way position and keeps the diaphragm blade 50 in the stopping-down position.

Further, when the rotor 61 is positioned in the counterclockwise rotation end in the rotatable range counterclockwise-rotated by about 17° from the operating center, namely when the shutter blade 40 is in the closing position and the diaphragm blade 50 is in the stopping-down position, the rotor 61 generates the greatest magnetic attraction force F6 which acts on the shutter blade 40 so as to move it toward the closing direction and the spring 70 generates the greatest urging force (spring force) F5 which acts on the shutter blade 40 so as to move it toward the opening direction. Consequently, within the range of the stopping-down position to the closing position, an urging force F4 that is a resultant force of the magnetic attraction force F2 and urging force F3 acts on the shutter blade 40 so as to move it toward the opening direction.

Besides, with respect to values of magnetic attraction forces F1, F2, F6 and urging forces F3, F5, for example, F1 may be same to F2, F3 may be two times of F2, F5 may be about three times of F2, and F6 may be about two times of F2.

Next, in case the camera shutter unit according as the above-mentioned embodiment, for example, is carried on a digital still camera, the operation will be explained taken in connection with operation views showing in FIGS. 7 to 9 and control time charts showing in FIGS. 10A and 10B.

Besides, the digital still camera carrying the camera shutter unit according as this embodiment is provided with a control section (CPU, etc.) as a control means for conducting various controls, a CCD (Charge-Coupled Device) serving as a photographing element, an image signal processing circuit that memorizes image signals outputted from the CCD, a shutter release switch for shutter-releasing, a main switch and so on.

First, when an operator switches on the main switch, control signals outputted from the control section switch on the CCD to make it operate. At this time, the shutter blade 40 is positioned in the opening position (full-opening position) wherein the aperture 30a is opened and the diaphragm blade 50 is positioned in the evacuating position wherein the aperture 30a is not stopped down.

That is, the rotor 61 of electromagnetic drive source 60, as shown in FIG. 5A, is urged to the clockwise direction by its magnetic attraction force with non-energized Therefore, as shown in FIG. 7, the driving pin 61a makes the edge 41d of the first shutter blade 41 come in contact with the stopper 10e and makes the edge 42d of the second shutter blade 42 come in contact with the stopper 10d via the elongated hole 41c in the first shutter blade 41, the elongated hole 42c in the second shutter blade 42, and the contact hole 53 (under inside edge 53a) in the diaphragm blade 50, thereby positioning and holding first and second shutter blades 41, 42 in the opening position and holding the rotor 61 itself in its angle position. Also, the diaphragm blade 50 is held in the evacuating position wherein the stopping-down of the aperture 30a is released by balance between the clockwise-urging force by the spring 80 and the counterclockwise-urging force by the electromagnetic drive source 60.

As described above, with the aperture 30a being opened, subject light reaches the CCD and then, on the basis of signals outputted from the CCD, the control section calculates suitable diaphragm value, namely, judges whether or not to stop down by the diaphragm blade 50 and calculates its exposure time. Further, in the case of one operating mode wherein the diaphragm blade 50 does not stop down the aperture 30a, the unit stands by for photographing in condition shown in FIG. 7.

Here, when the shutter-releasing operation is done, control signals from the control section reset the CCD. Next, the CCD starts storing up electrical charge and, as shown in FIG. 10A, after an elapse of a predetermined time (T), the coil 62 is started energizing with predetermined current (I1) during a predetermined time (T1) such that the electromagnetic drive source 60 generates a predetermined or more driving force which overcomes the urging force F5 of spring 70. Consequently, toward the condition shown in FIG. 9 from the condition shown in FIG. 7, the rotor 61 of the electromagnetic 60 rotates in the counterclockwise direction, whereby first and second shutter blades 41, 42 immediately move to the closing position and the edge 41e of the first shutter blade 41 touches the stopper 10f to stop. Then the diaphragm blade 50 moves to the stopping-down position by urging force of the spring 80, whereby its edge 56 touches the stopper 10g to stop.

In the above-mentioned sequence of operation, the exposure time is during from the start of electrical charge storage in the CCD to the finish of closing of the aperture 30a by the shutter blade 40. Next, the control section controls, via the image signal processing circuit and so on, to make a storage, such as on memory cards to store the photographed image signals. Accordingly, a single photographing operation is completed.

After that, by signals outputted from the control section, as shown in FIG. 10A, the coil 62 is energized with predetermined current I2 during a predetermined time (T2) and after that, is energized with reversed current I3 during a predetermined time (T3). At the same time, toward the condition shown in FIG. 7 from the condition shown in FIG. 9, the rotor 61 of the electromagnetic drive source 60 rotates in the clockwise direction, whereby respective first and second shutter blades 41, 42 immediately move to the opening position. Next, the edge 41d of the first shutter blade 41 touches the stopper 10e and the edge 42d of the second shutter blade 42 touches the stopper 10d, thereby stopping respectively. Then, since the driving pin 61a pushes the under inside edge 53a of the contact hole 53 against the urging force of the spring 80, the diaphragm blade 50 immediately moves from the aperture 30a to the evacuating position.

Thus, when the shutter blade 40 stops in the opening position and the diaphragm blade 40 stops in the evacuating position, the energizing of the coil 62 is stopped, thereby becoming in a non-energized condition. Since the clockwise rotation urging force (i.e. magnetic attraction force) acts on the electromagnetic drive source 60 as shown in FIG. 5A, the shutter blade 40 and diaphragm blade 50 are respectively held in the opening position and evacuating position. That is, the use of magnetic attraction force in order to hold the shutter blade 40 and diaphragm blade 50 eliminates the need to energize and can reduce power consumption by its corresponding amount.

In the above-mentioned control sequence of full-opening (opening position), full-closing (closing position) and full-opening (opening position), as energizing time T1, T2, and T3, for example, respectively adopted can be T1=30 ms, T2=30 ms, and T3=20 ms.

On the other hand, in the case of another operating mode wherein the control section judges to stop down the aperture 30*a* by the diaphragm blade 50 on the basis of signals outputted from the CD exposed to subject light, first, by signals outputted from the control section, as shown in FIG. 10B, the energizing of the coil 62 is started a plurality of times (here, two times) with predetermined current I4, period (T4) and during a predetermined time (T5). That is, a plural (two times) pulse-energizing control is achieved. Here, the value of current 14 is smaller than the current I1 that moves the shutter blade 40 to the closing position and is a value capable of making the rotor 61 rotate in the counterclockwise direction and moving the shutter blade 40 to the way position namely moving the diaphragm blade 50 to the stopping-down position.

According to this pulse-energizing control, when the rotor 61 rotates in the counterclockwise direction, the first shutter blade 41 starts rotating in the counterclockwise direction and the second shutter blade 42 starts rotating in the clockwise direction. At the same time, the diaphragm blade 50 starts rotating in the clockwise direction while following the second shutter blade 42 by the spring 80. Next, as shown in FIG. 8, when the edge 41*e* of the first shutter blade 41 touches the another end 72 of the spring 70 serving as a restricting means, further counterclockwise rotation of the first shutter blade 41 is restricted and rotation of the second shutter blade 42 is restricted. Further, the edge 56 of the diaphragm blade 50 touches the stopper 10*g*, so that further rotation of the diaphragm blade 50 is restricted.

Figure 12:
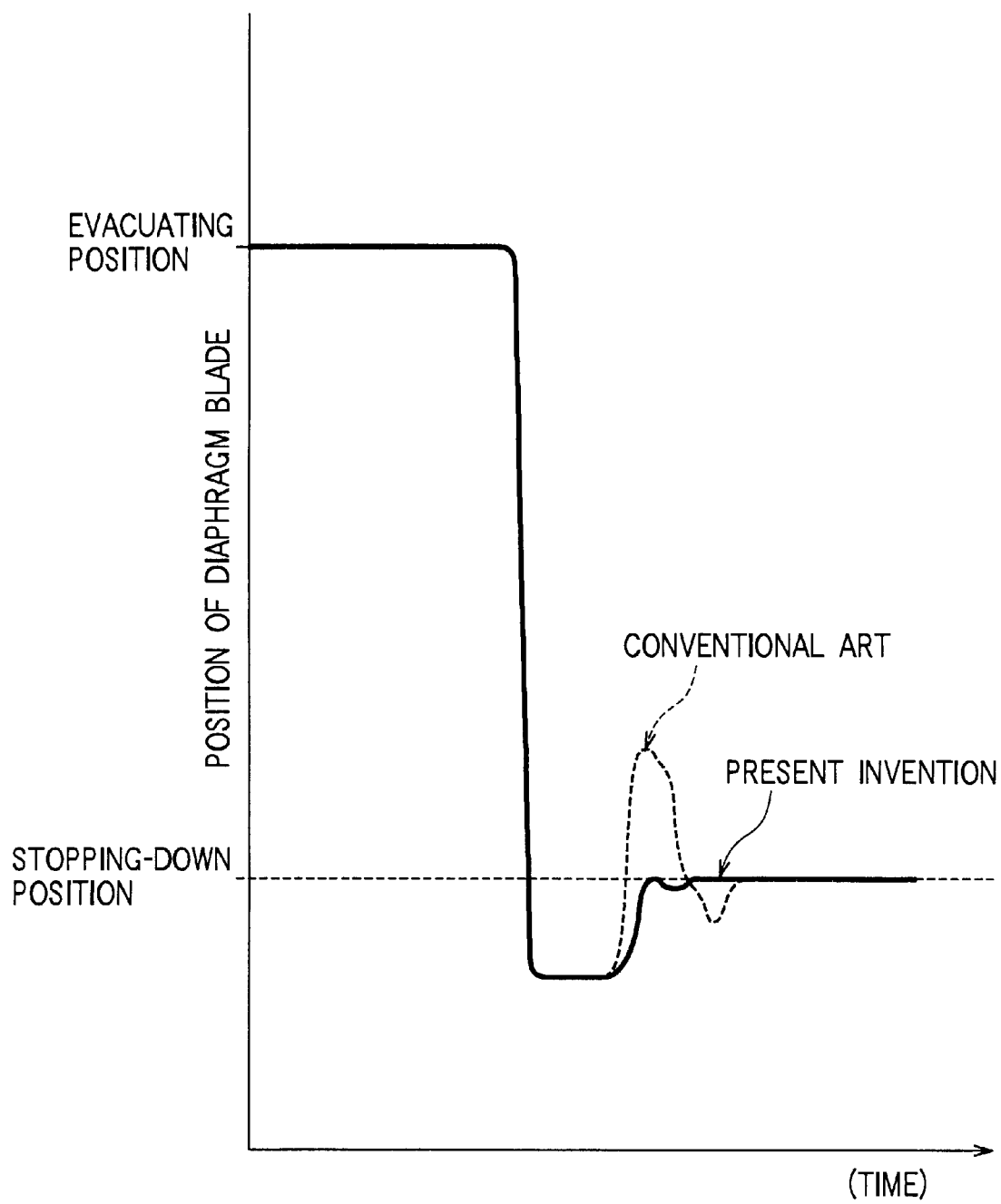
FIG. 12 is a view showing a characteristic of dynamic behavior of the diaphragm blade by controlling such as shown in FIGS. 10A, 10B, 11A, and 11B.

Upon positioning of the diaphragm blade 50, the plural plus-energizing control by the electromagnetic drive source 60 allows the diaphragm blade 50 to be positioned in a desired position while rapidly converging without bouncing greatly as shown in FIG. 12, particularly when the edge 50 of the diaphragm blade 50 touches the stopper 10*g* and stop.

That is, the diaphragm blade 50 is rapidly positioned in the stopping-down position wherein the aperture 30*a* is stopped down to a predetermined aperture diameter and the shutter blade 40 first and second shutter blades 41, 42) is positioned in the way position toward the dosing position from the opening position and is kept in the stand-by condition shown in FIG. 8 for photographing.

By the way, in this stand-by condition, the electromagnetic drive source 60 is not energized to be in the non-energized condition. However, since the counterclockwise rotation urging force (magnetic attraction force) such as shown in FIG. 5B acts on the electromagnetic drive source 60, the shutter blade 40 and diaphragm blade 50 are respectively held in the way position and stopping-down position.

That is, the use of magnetic attraction force in order to hold the shutter blade 40 and diaphragm blade 50 eliminates the need to energize and can reduce power consumption by its corresponding amount.

In this stand-by condition, when the shutter-releasing operation is done, control signals from the control section reset the CCD. Next, the CCD starts storing up electrical charge and, as shown in FIG. 10B, after an elapse of a predetermined time (T), the coil 62 is started energizing with predetermined current (I1) during a predetermined time (T1) such that the electromagnetic drive source 60 generates a predetermined or more driving force which overcomes the urging force F5 of the spring 70.

Consequently, toward the condition shown in FIG. 9 from the condition shown in FIG. 8, the rotor 61 of electromagnetic 60 rotates in the counterclockwise direction, whereby first and second shutter blades 41, 42 respectively move to the closing position and the edge 41*e* of the first shutter blade 41 touches the stopper 10*f* to stop. Besides, at this time, the driving pin 61*a* freely runs within the contact hole 53 with departing from the under inside edge 53*a* However, since the edge 56 of the diaphragm blade 50 is in contact with the stopper 10 g, the diaphragm blade 50 is held in the stopping-down position.

In the above-mentioned sequence of operation, the exposure time is during from the start of electrical charge storage in the COD to the finish of closing of the aperture 30*a* by the shutter blade 40. Next, the control section controls, via the image signal processing circuit and so on, to make a storage, such as on memory cards to store photographed image signals. Accordingly, a single photographing operation is completed.

After that, by signals outputted from the control section, the coil 62 is energized with predetermined current I2 during a predetermined time (T2) and after that, is energized with reversed current I3 during a predetermined time (T3). At the same time, toward the condition shown in FIG. 7 from the condition shown in FIG. 9, the rotor 61 rotates in the clockwise direction, whereby respective first and second shutter blades 41, 42 move to the opening position. Next, the edge 41*d* of the first shutter blade 41 touches the stopper 10*e* and the edge 42*d* of the second shutter blade 42 touches the stopper 10*d*, thereby stopping respectively. Then, since the driving pin 61*a* pushes the under inside edge 53*a* of the contact hole 53 against the urging force of the spring 80, the diaphragm blade 50 moves from the aperture 30*a* to the evacuating position.

Thus, when the shutter blade 40 stops in the opening position and the diaphragm blade 40 stops in the evacuating position, the energizing of the coil 62 is stopped to become in a non-energized condition. Likewise above-mentioned, since the clockwise magnetic attraction force by the electromagnetic drive source 60 holds the shutter blade 40 and diaphragm blade 50, it is possible to reduce power consumption by its corresponding amount.

In the above-mentioned control sequence of full-opening (opening position), stopping-down (stopping-down position), full-dosing (dosing position) and full-opening (opening position), as energizing times T1, T2, T3, T5 and period T4, for example, respectively adopted can be T1=30 ms, T2=30 ms, T3=20 ms, T5=2 ms, and T4=5 ms. Also, the number of times of the above-mentioned plus energizing control may be not only two times but also, according as necessary, plural times such as three times, four times and the like.

According to the above-mentioned control sequence, when the aperture 30*a* is reopened and subject light reaches the COD, on the basis of signals outputted from the COD, the control section calculates suitable diaphragm value, namely, judges whether or not to stop down by the diaphragm blade 50 and calculates its exposure time. Next, in the case of operating mode wherein the diaphragm blade 50 does not stop down the aperture 30a, the unit stands by for photographing in a condition shown in FIG. 7. While, in the case of an operating mode wherein the diaphragm blade 50 stops down the aperture 30a, the unit stands by for photographing in a condition shown in FIG. 8.

FIGS. 11A and 11B are time charts showing another control sequence for controlling the operation of the camera shutter unit of the embodiment. In this control sequence, on the basis of signals outputted from the COD which is exposed to subject light, the control section calculates suitable diaphragm value, i.e., judges whether or not to stop down by the diaphragm blade 50. The mode in which the diaphragm blade 50 does not stop down the aperture 30a is controlled as same to the above-mentioned control sequence, while only the control operation in which the diaphragm blade 50 stops down the aperture 30a is different from the above-mentioned control sequence. Therefore, only this control operation will be explained.

Namely, in the case of operating mode wherein the control section judges to stop down the aperture 30a by the diaphragm blade 50 on the basis of signals outputted from the CCD exposed to subject light, first, by signals outputted from the control section, as shown in FIG. 11B, the coil 62 is energized with predetermined current I5 during a predetermined time (T6) and further, is energized with current I6 smaller than current I5 during a predetermined time (T7).

That is, during a predetermined energizing time (T6+T7), the energizing control which decreases the magnitude of current from I5 to I6 in the form of steps is carried out. Here, values of the current I5, I6 are smaller than the current I1 that moves the shutter blade 40 to the dosing position and is a value capable of making the rotor 61 rotate in the counterclockwise direction and moving the shutter blade 40 to the way position, i.e., moving the diaphragm blade 50 to the stopping-down position.

According to this stepping-down energizing control, when the rotor 61 rotates in the counterclockwise direction, the first and second shutter blades 41, 42 start rotating. At the same time, the diaphragm blade 50 starts rotating while following the second shutter blade 42 by urging force of the spring 80.

Next, as shown in FIG. 8, when the edge 41e of the first shutter blade 41 touches the another end 72 of the spring 70 serving as a restricting means, more counterclockwise rotation of the first shutter blade 41 is restricted and rotation of the second shutter blade 42 is restricted. Further, the edge 56 of the diaphragm blade 50 touches the stopper 10g, so that its excess rotation is restricted.

Upon positioning of the diaphragm blade 50, the stepping-down energizing control by the electromagnetic drive source 60 allows the diaphragm blade 50 to be positioned in a desired position while rapidly converging without great bouncing as shown in FIG. 12, particularly when the edge 50 of the diaphragm blade 50 touches the stopper 10g to stop.

That is, the diaphragm blade 50 is rapidly positioned in the stopping-down position wherein the aperture 30a is stopped down to a predetermined aperture diameter while the shutter blade 40 (first and second shutter blades 41, 42) is positioned in the way position toward the closing position from the opening position and stands by for photographing in the condition shown in FIG. 8.

By the way, in this stand-by condition, the electromagnetic drive source 60 is not energized to be in the non-energized condition. However, since the counterclockwise rotation urging force (magnetic attraction force) such as shown in FIG. 5B acts on the electromagnetic drive source 60, the shutter blade 40 and diaphragm blade 50 are to be respectively held in the way position and stopping-down position.

That is, the use of magnetic attraction force in order to hold the shutter blade 40 and diaphragm blade 50 eliminates the need to energize and can reduce power consumption by its corresponding amount.

In this stand-by condition, when the shutter-releasing operation is done, as similar to the above-mentioned control sequence, control signals outputted from the control section reset the CCD. Next, the CCD starts storing up electrical charge and, as shown in FIG. 11B, after an elapse of a predetermined time (T), the coil 62 is energized with predetermined current (II) during a predetermined time (T1) such that the electromagnetic drive source 60 generates a predetermined or more driving force which overcomes the urging force F5 of the spring 70.

Consequently, toward the condition shown in FIG. 9 from the condition shown in FIG. 8, the rotor 61 rotates in the counterclockwise direction, whereby the first and second shutter blades 41, 42 move to the closing position with the diaphragm blade 50 being held and positioned in the stopping-down position. At the same time, the edge 41e of the first shutter blade 41 touches the stopper 10f to stop.

After that, as similar to the above-mentioned control sequence, photographed image signals are stored in the memory card and the like. Next, by signals outputted from the control section, the coil 62 is energized with predetermined current I2 during a predetermined time (T2) and after that, is energized with reversed current I3 during a predetermined time (T3), whereby the shutter blade 40 moves to the opening position and the diaphragm blade 50 moves to the evacuating position. After that, the energizing of the coil 62 is stopped. With the aperture 30a being reopened, when subject light reaches the COD, on the basis of signals outputted from the CCD, the control section calculates and judges whether or not to stop down by the diaphragm blade 50 and so on.

After that, in the case of an operating mode wherein the diaphragm blade 50 does not stop down the aperture 30a, the unit stands by for photographing in the condition shown in FIG. 7. While, in the case of an operating mode wherein the diaphragm blade 50 stops down the aperture 30a, the unit stands by for photographing in the condition shown in FIG. 8.

In the above-mentioned control sequence of full-opening (opening position), stopping-down (stopping-down position), full-dosing (dosing position) and full-opening (opening position), as energizing times T1, T2, T3, T6, and T7, for example, respectively adopted can be T1=30 ms, T2=30 ms, T3=20 ms, T6=6 ms, and T7=4 ms.

In the above-mentioned embodiment, the adaptation of the camera shutter unit according to the present is shown relates to a digital still camera, however, is invention not limited thereto. The camera shutter unit can be adapted to other cameras such as a film-type camera or the like.

Also, in the camera shutter unit of the above-mentioned embodiment, the shutter blade 40 is composed of two blades of first and second shutter blades 41, 42, however, is not limited thereto. The constituent composed of one, three or more shutter blades can be adopted.

Further, with respect to the spring 70 serving as a restricting means, adopted can be not only a torsion type spring but also, if functions likewise, a compression type spring, a tension type spring, or the like. As mentioned above, according to the camera shutter unit of the present invention, as a drive control mechanism for drive-controlling so as to move the shutter blade and diaphragm blade at a desired timing, adopted are a single electromagnetic drive source capable of driving to interlock the diaphragm blade with the shutter blade and a restricting means for restricting movement of the shutter blade toward the closing position when the diaphragm blade is positioned in the stopping-down position and for releasing its restriction by a predetermined or more level drive force which is generated by the electromagnetic drive source. Consequently, the single electromagnetic drive source can drive the shutter blade and diaphragm blade and the operation of the restricting means in accordance with the amount of a drive force from the electromagnetic drive source, which can restrict movement of the shutter blade and can release its restriction. Accordingly, the shutter blade and diaphragm blade can function reliably and the unit can be of a small size, lightweight, or the like.

Also, the adoption of the single spring serving as a restricting means makes it possible to improve the reliability of function and to simplify the unit.

Further, in a non-energized condition, the shutter blade and diaphragm blade can be held and stand by in the way position and stopping-down position or in the opening position and evacuating position. Consequently, since the time-longest condition in the control sequence is not energized, its power consumption can be reduced and lifetime of a power source can be lengthened.

Furthermore, when the drive force of the electromagnetic drive source makes the diaphragm blade move to the stopping-down position, the energizing-control which generates a plurality of pulses or decreases current (or voltage) in the form of steps or continuously can prevent the diaphragm blade from bouncing or can restrain it. Accordingly, the diaphragm blade can be quickly positioned in the stopping-down position.

It is further understood by those skill in the art that the foregoing description is a preferred embodiment of the disclosed unit and that various changes and modifications may be made in the invention without departing from the spirit and scope thereof.

What is claimed is:

1. A camera shutter unit, comprising:

a base plate having an exposure aperture;

a diaphragm blade arranged to be capable of moving between a stopping-down position wherein the aperture is stopped down and an evacuating position wherein the aperture is opened;

a shutter blade arranged to be capable of moving between an opening position wherein the aperture is opened and a closing position wherein the aperture is closed; and a drive-control mechanism for drive-controlling the shutter blade and the diaphragm blade, the drive-control mechanism having a single electromagnetic drive source capable of driving the shutter blade and the diaphragm blade to interlock the diaphragm blade with the shutter blade and a restricting means for restricting movement of the shutter blade toward the closing position when the diaphragm blade is positioned in the stopping-down position and for releasing its restriction by a drive force generated by the electromagnetic drive source, wherein the electromagnetic drive source keeps the shutter blade in a way position corresponding to a condition where the diaphragm blade is kept in the stopping-down position via magnetic force while the electromagnetic drive source is non-energized, and the electromagnetic drive source keeps the shutter blade in the opening position with the diaphragm blade in the evacuating position via magnetic force while the electromagnetic drive source is non-energized.

2. A camera shutter unit as set forth in claim 1, wherein the restricting means is a spring urging the shutter blade toward the opening position when the shutter blade is positioned between the closing position and the way position.

3. A camera shutter unit as set forth in claim 1, wherein the drive-control mechanism has a control means for controlling the electromagnetic drive source, and the control means controls the electromagnetic drive source by generating a plurality of pulses when making the diaphragm blade move to the stopping-down position.

4. A camera shutter unit as set forth in claim 1, wherein the drive-control mechanism has a control means for controlling the electromagnetic drive source, and the control means controls the electromagnetic drive source by decreasing a magnitude of energizing during a predetermined energized time when making the diaphragm blade move to the stopping-down position.

5. A camera shutter unit, comprising:

a base plate having an exposure aperture;

a diaphragm blade capable of moving between a stopping-down position where the aperture is stopped down and an evacuating position where the aperture is opened;

a shutter blade capable of moving between an opening position where the aperture is opened and a closing position where the aperture is closed; and a drive-control mechanism for drive-controlling the shutter blade and the diaphragm blade, the drive-control mechanism having a single electromagnetic drive source capable of driving the shutter blade and the diaphragm blade to interlock the diaphragm blade with the shutter blade, and a restricting unit to restrict movement of the shutter blade towards the closing position when the diaphragm blade is positioned in the stopping-down position and for releasing its restriction by a drive force generated by the electromagnetic drive source, wherein the electromagnetic drive source keeps the shutter blade in a way position corresponding to a condition where the diaphragm blade is kept in the stopping-down position via magnetic force while the electromagnetic drive source is non-energized, and the electromagnetic drive source keeps the shutter blade in the opening position with the diaphragm blade in the evacuating position via magnetic force while the electromagnetic drive source is non-energized.

* * * * *